(12) United States Patent
Miyagawa et al.

(10) Patent No.: US 10,926,442 B2
(45) Date of Patent: Feb. 23, 2021

(54) MOLD OF RESIN BODY AND RESIN BODY

(71) Applicants: TOYOTA JIDOSHA KABUSHIKI KAISHA, Toyota (JP); TOYOTA BOSHOKU KABUSHIKI KAISHA, Kariya (JP)

(72) Inventors: Yoichi Miyagawa, Miyoshi (JP); Tetsuharu Ogawa, Gifu (JP)

(73) Assignees: TOYOTA JIDOSHA KABUSHIKI KAISHA, Toyota (JP); TOYOTA BOSHOKU KABUSHIKI KAISHA, Kariya (JP)

( * ) Notice: Subject to any disclaimer, the term of this patent is extended or adjusted under 35 U.S.C. 154(b) by 36 days.

(21) Appl. No.: 16/255,939

(22) Filed: Jan. 24, 2019

(65) Prior Publication Data
US 2019/0283296 A1  Sep. 19, 2019

(30) Foreign Application Priority Data

Mar. 15, 2018 (JP) .............................. JP2018-048281

(51) Int. Cl.
*B29C 45/16* (2006.01)
*B32B 5/20* (2006.01)
(Continued)

(52) U.S. Cl.
CPC .......... *B29C 45/1635* (2013.01); *B29C 45/26* (2013.01); *B32B 5/20* (2013.01);
(Continued)

(58) Field of Classification Search
CPC ..... B29C 45/1635; B29C 45/26; B32B 25/08; B32B 5/20; B32B 2250/02
See application file for complete search history.

(56) References Cited

U.S. PATENT DOCUMENTS 3,506,533 A    4/1970  Berner
3,553,785 A *  1/1971  Serle ....................... B29C 45/26
                                                       425/571
(Continued)

FOREIGN PATENT DOCUMENTS

CN    104653781 A   5/2015
DE    82 10 590 U1  6/1982
(Continued)

OTHER PUBLICATIONS

Office Action issued in U.S. Appl. No. 16/271,904 dated Jul. 31, 2020.
(Continued)

*Primary Examiner* — Xiao S Zhao
*Assistant Examiner* — Emmanuel S Luk
(74) *Attorney, Agent, or Firm* — Oblon, McClelland, Maier & Neustadt, L.L.P.

(57) ABSTRACT

The present disclosure provides a mold of a resin body capable of reducing the cost of manufacturing a resin body including a resin base material and a foamed resin part provided on the resin base material. This mold is a mold of a resin body including resin base material molding die parts for molding a resin base material. The mold includes: a sliding part capable of sliding inside a foamed resin part molding cavity that communicates with a resin base material molding cavity of the resin base material molding die parts. The sliding part is swingably floated in a direction perpendicular to a sliding surface on which the sliding part slides. In the process of molding the resin base material, the sliding part blocks an opening part that communicates from the resin base material molding cavity to the foamed resin part molding cavity.

3 Claims, 17 Drawing Sheets

(51) Int. Cl.
  *B32B 25/08*    (2006.01)
  *B29C 45/26*    (2006.01)
  *B29K 105/04*    (2006.01)
  *B29K 21/00*    (2006.01)

(52) U.S. Cl.
  CPC ........ *B32B 25/08* (2013.01); *B29K 2021/003* (2013.01); *B29K 2105/04* (2013.01); *B32B 2250/02* (2013.01)

(56) References Cited

U.S. PATENT DOCUMENTS

| | | | |
|---|---|---|---|
| 3,792,141 A | 2/1974 | Offutt | |
| 4,741,689 A * | 5/1988 | Onizawa | B29C 45/2608 249/160 |
| 5,074,779 A * | 12/1991 | Tsutsumi | B29C 45/40 425/444 |
| 5,472,655 A * | 12/1995 | Morita | B29C 45/062 264/245 |
| 6,224,364 B1 | 5/2001 | Harvey | |
| 6,500,376 B1 * | 12/2002 | Pack | B29C 45/1635 264/2.2 |
| 7,311,506 B2 * | 12/2007 | Border | B29C 45/2606 425/135 |
| 7,393,490 B2 * | 7/2008 | Matsunaga | B29C 45/4471 264/318 |
| 10,682,794 B2 * | 6/2020 | Navarra Pruna | B29C 45/4471 |
| 2003/0214071 A1 * | 11/2003 | Ogawa | B29C 45/33 264/255 |
| 2004/0017023 A1 | 1/2004 | Schoemann et al. | |
| 2004/0070110 A1 | 4/2004 | Youngs et al. | |
| 2005/0037105 A1 * | 2/2005 | Dry | B29C 45/1657 425/130 |
| 2006/0066009 A1 * | 3/2006 | Matsunaga | B29C 45/4471 264/318 |
| 2010/0013124 A1 * | 1/2010 | Kong | B29C 45/1639 264/328.8 |
| 2010/0019124 A1 * | 1/2010 | Di Rienzo | B29C 45/1635 249/161 |
| 2010/0155981 A1 * | 6/2010 | Miyabe | B29C 45/062 264/45.2 |
| 2010/0187722 A1 * | 7/2010 | Fiammengo | B29C 45/1639 264/255 |
| 2011/0123667 A1 * | 5/2011 | Kong | B29C 45/1635 425/542 |
| 2013/0106140 A1 * | 5/2013 | Ishikawa | B60J 10/25 296/192 |
| 2014/0291891 A1 * | 10/2014 | Charnay | A46B 9/021 264/296 |
| 2015/0093546 A1 | 4/2015 | Ishii et al. | |
| 2015/0352761 A1 * | 12/2015 | Okamoto | B29C 45/0003 264/45.2 |
| 2017/0197345 A1 * | 7/2017 | Okamoto | B29C 44/1219 |
| 2017/0266859 A1 * | 9/2017 | Neerincx | B29C 71/02 |
| 2019/0283296 A1 | 9/2019 | Yoichi | |

FOREIGN PATENT DOCUMENTS

| | | |
|---|---|---|
| DE | 34 46 020 A1 | 6/1986 |
| DE | 101 35 038 A1 | 2/2003 |
| DE | 103 34 528 A1 | 2/2004 |
| DE | 10 2013 004 196 A1 | 9/2014 |
| GB | 1 414 791 A | 11/1975 |
| JP | 7-80885 | 3/1995 |
| JP | 2002-168505 A | 6/2002 |
| JP | 2012-20420 A | 2/2012 |

OTHER PUBLICATIONS

U.S. Office Action issued in U.S. Appl. No. 16/271,904 dated Nov. 2, 2020.

* cited by examiner

MOLD OF RESIN BODY AND RESIN BODY

CROSS REFERENCE TO RELATED APPLICATIONS

This application is based upon and claims the benefit of priority from Japanese patent application No. 2018-048281, filed on Mar. 15, 2018, the disclosure of which is incorporated herein in its entirety by reference.

BACKGROUND

The present disclosure relates to a mold of a resin body and a resin body.

There is a resin body that includes a resin base material and a foamed resin part provided on the resin base material. After a molten resin is molded to form a resin base material, a foamed resin is filled into a mold and foamed inside the mold, whereby the foamed resin part is formed. One example of a method of manufacturing a resin body is disclosed in Japanese Unexamined Patent Application Publication No. H07-080885.

SUMMARY

The present inventors have found the following problems.

In the method of manufacturing the resin body described above, a mold for forming a resin base material and a mold for forming a foamed resin part are often used. Therefore, there is a room for reducing the manufacturing cost.

Incidentally, there is a mold for a resin base material including a core that can come close to or is separated from one mold and is slidably provided on another mold. It may be possible to sequentially perform formation of the resin base material and formation of the foamed resin part using just one mold for a resin base material. When this mold for the resin base material is used, it is possible that the mold may be distorted due to heat given by resin, which prevents the core from sliding. Therefore, there is a room for reducing the manufacturing cost of the resin body.

Molds 91 and 92 shown in FIG. 18 are specific examples of the mold for the resin base material. The mold 91 is arranged so as to be opposed to the mold 92 or to be pressed against it. A core 93 is slidably provided inside the mold 92 and can come close to or be away from the mold 91. As shown in FIG. 19, when the mold 92 is deformed, the mold 92 may mechanically interfere with the core 93, which may prevent the core 93 from sliding.

The present disclosure aims to reduce the cost of manufacturing a resin body including a resin base material and a foamed resin part provided on the resin base material.

A mold of a resin body according to the present disclosure is a mold of a resin body including
a resin base material molding die part for molding a resin base material, the mold of the resin body including:
 a sliding part capable of sliding inside a foamed resin part molding cavity that communicates with a resin base material molding cavity of the resin base material molding die part, in which
 the sliding part is swingably floated in a direction perpendicular to a sliding surface on which the sliding part slides,
 in the process of molding the resin base material, the sliding part blocks an opening part that communicates from the resin base material molding cavity to the foamed resin part molding cavity, and in the process of molding the foamed resin part, after a foamed resin material is filled into the foamed resin part molding cavity, the sliding part is separated from the resin base material molding cavity, thereby increasing a filling space that can be filled with the foamed resin material.

According to the aforementioned structure, the sliding part is swingably floated, which enables the sliding part to slide even when the mold of the resin body is distorted due to heat given by the resin material. Therefore, it is possible to provide a mold capable of integrally molding the foamed resin part and the resin base material and molding the resin body. The foamed resin part and the resin base material can be integrally molded and the resin body can be molded using only one mold, without using a plurality of molds. It is therefore possible to reduce the cost of manufacturing the resin body including the resin base material and the foamed resin part provided on the resin base material.

Further, a recessed part may be provided on a distal end surface of the sliding part on a side of the resin base material molding cavity.

According to the aforementioned structure, the recessed part is provided on the distal end surface of the sliding part on the side of the resin base material molding cavity. Therefore, in the process of molding the foamed resin part, when the foamed resin is filled into the foamed resin part molding cavity, the size of the contact area of the foamed resin part with the sliding part can be increased. Since it is possible to prevent the foamed resin part from being away from the sliding part, it is therefore possible to mold the foamed resin part with a high precision.

Further, a resin body according to the present disclosure is a resin body including a resin base material and a foamed resin part, in which
 the foamed resin part includes a foamed resin body provided on the resin base material and a protruding part having a foaming ratio lower than that of the foamed resin body while covering the foamed resin body,
 the protruding part is protruded to a side opposite to the side of the resin base material in the foamed resin part,
 the resin base material includes a base material protruding part in at least a part of an interface between the resin base material and the foamed resin body, and
 the base material protruding part is protruded toward the inside of the foamed resin body.

According to the aforementioned structure, in the process of molding the foamed resin part, when the foamed resin is filled into the foamed resin part molding cavity of the mold, the size of the contact area of the foamed resin part with the mold can be increased. Accordingly, since it is possible to prevent the foamed resin part from being away from the sliding part of the mold, it is therefore possible to mold the foamed resin part with a high precision. Further, using the mold of the resin body according to the present disclosure described above, the resin base material and the foamed resin part can be integrally molded. That is, this integral molding can be performed using only one mold, without using a plurality of molds. It is therefore possible to reduce the cost of manufacturing the resin body including the resin base material and the foamed resin part provided on the resin base material.

According to the present disclosure, it is possible to reduce the cost of manufacturing the resin body including the resin base material and the foamed resin part provided on the resin base material.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

The specific embodiment to which the invention is applied will be described hereinafter in detail with reference to the drawings. It should be noted, however, that the invention is not limited to the following embodiment. Besides, the following description and drawings are simplified as appropriate for the sake of clarification of explanation. In FIGS. 1-19, a right-handed three-dimensional xyz orthogonal coordinate system is specified. Incidentally, as a matter of course, the right-handed xyz-coordinate system shown in FIG. 1 and the other drawings is used for the sake of convenience to illustrate a positional relationship among components. In general, as is common among the drawings, a positive direction along a z-axis is a vertically upward direction, and an xy-plane is a horizontal plane.

First Embodiment

Figure 1:
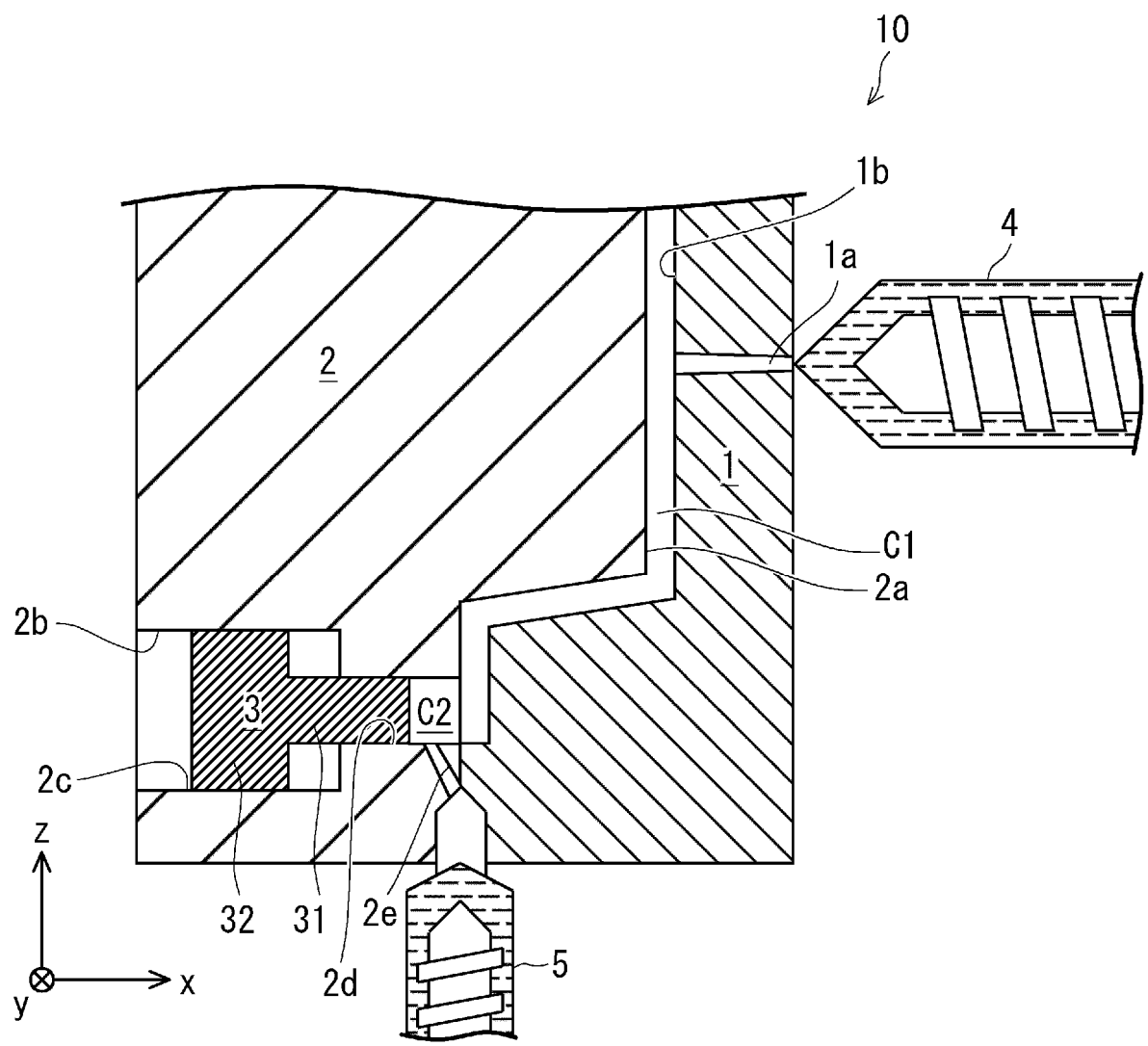
FIG. 1 is a schematic cross-sectional view of a mold of a resin body according to a first embodiment.
Figure 2:
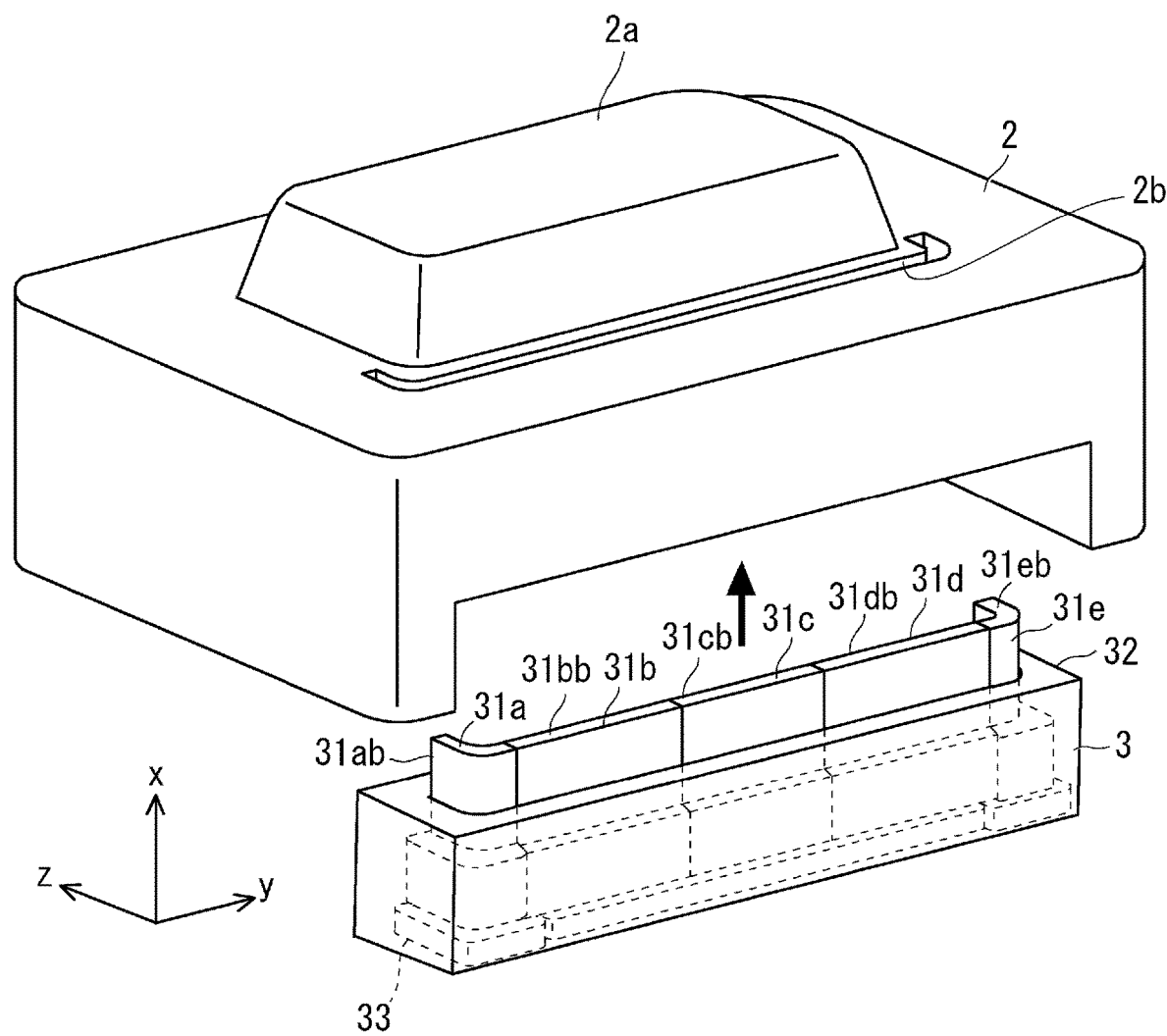
FIG. 2 is an exploded perspective view of a movable die of the mold of the resin body according to the first embodiment.
Figure 3:
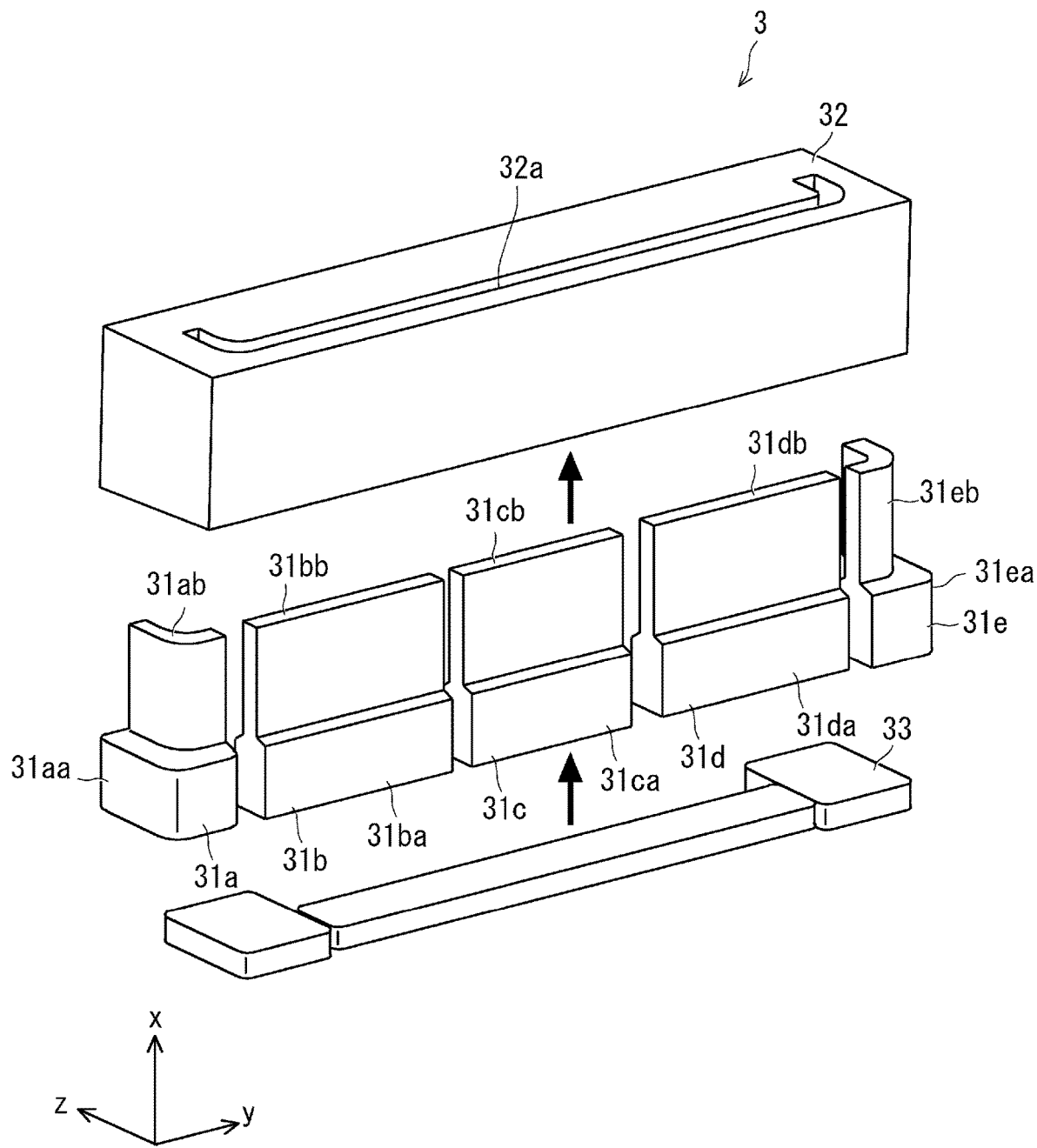
FIG. 3 is an exploded perspective view of a core of the mold of the resin body according to the first embodiment.
Figure 4:
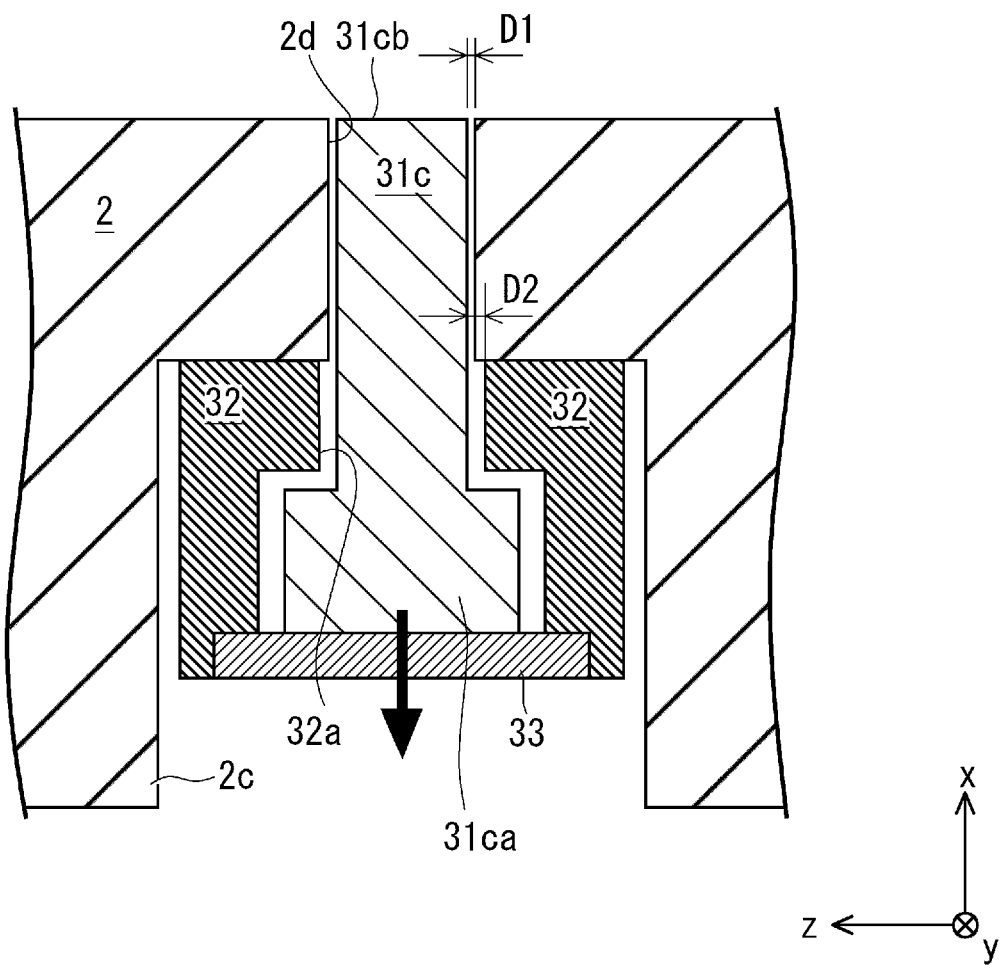
FIG. 4 is an xz cross sectional view of a divided core 31c and other peripheral structures.

Referring to FIGS. 1-4, a mold of a resin body according to a first embodiment will be explained. FIG. 1 is a schematic cross-sectional view of the mold of the resin body according to the first embodiment. FIG. 2 is an exploded perspective view of a movable die of the mold of the resin body according to the first embodiment. FIG. 3 is an exploded perspective view of a core of the mold of the resin body according to the first embodiment. FIG. 4 is an xz cross sectional view of a divided core 31c and other peripheral structures.

As shown in FIG. 1, a mold 10 includes a fixed die 1 and a movable die 2. The fixed die 1 and the movable die 2 may each be referred to as a resin base material molding die part. The mold 10 can be used along with an injection molding machine (not shown) and the like in order to mold the resin body.

The fixed die 1 is held at a predetermined position by an injection molding machine or the like. The fixed die 1 includes an inflow hole 1a and a resin base material molding surface 1b. A molten resin can be made to flow into the inflow hole 1a from a resin base material molding injection nozzle 4. The resin base material molding surface 1b is continuous with the inner wall surface of the inflow hole 1a.

The movable die 2 is held by an injection molding machine or the like in such a way that the movable die 2 can be pressed against or separated from the fixed die 1. As shown in FIG. 2, the movable die 2 includes a resin base material molding surface 2a and a sliding part holding hole 2b. The sliding part holding hole 2b includes holes 2c and 2d that slidably hold the sliding part 3. The hole 2d communicates with the hole 2c. The hole 2c is preferably thicker than the hole 2d. The hole 2c preferably has a cross-sectional area lager than that of the hole 2d.

As shown in FIG. 1, when the movable die 2 is pressed against the fixed die 1, a resin base material molding cavity C1 is formed between the resin base material molding surface 2a and the resin base material molding surface 1b. Further, when the distal end of the sliding part 3 is separated from the fixed die 1 while the movable die 2 is kept to be pressed against the fixed die 1, a foamed resin part molding cavity C2 is formed in the hole 2d. The foamed resin part molding cavity C2 communicates with the resin base material molding cavity C1. The molten resin is made to flow into the foamed resin part molding cavity C2 from a foamed resin part molding injection nozzle 5 through an inflow hole 2e.

As shown in FIG. 3, the sliding part 3 includes a core 31, a core holder 32, and a stopping plate 33. The core 31 preferably includes a plurality of divided cores. This is because, when the core 31 includes a plurality of divided cores, even when the core 31 is distorted and deformed by heat, the core 31 is not likely to mechanically interfere with the core holder 32 and the stopping plate 33. One example of the core 31 includes a plurality of divided cores 31a, 31b, 31c, 31d, and 31e.

One example of the divided core 31a includes a base part 31aa and a plate part 31ab that is extended from the base part 31aa. The cross-sectional area of the base part 31aa is larger than that of the plate part 31ab. In a similar way, one example of the divided core 31b includes a base part 31ba and a plate part 31bb, one example of the divided core 31c includes a base part 31ca and a plate part 31cb, and one example of the divided core 31d includes a base part 31da and a plate part 31db. The plate parts 31bb, 31cb, and 31db respectively extend from the base parts 31ba, 31ca, and 31da.

As shown in FIGS. 2 and 3, the core holder 32 includes a hole 32a that can hold the plurality of divided cores 31a-31e. The stopping plate 33 is fitted into the side opposite to the hole 32a in the core holder 32 while the plates 31ab-31eb of the divided cores 31a-31e are kept to be protruded from the hole 32a. When the hole 32a has a cross-sectional shape that is extended in the longitudinal direction (e.g., a string shape or an elliptical shape), the divided cores 31a-31e are preferably arranged in series in the longitudinal direction. The cross-sectional shape of the hole 32a may include a part bending in the longitudinal direction or an intersecting part where straight lines cross each other. In this case, in the vicinity of this part, the divided cores 31a and 31e among the divided cores 31a-31e are preferably arranged independently from one another. In other words, the core 31 is preferably divided in the vicinity of the bending part or the intersecting part where the straight lines cross each other. According to this structure, the divided cores 31a-31e tend to swing easily, whereby mechanical interface does not tend to occur.

The base parts 31aa-31ea are held between the core holder 32 and the stopping plate 33, and the divided cores 31a-31e are swingably held by the core holder 32 and the stopping plate 33.

The sliding part 3 preferably includes a floating structure in which the divided cores 31a-31e float in the core holder 32. Specifically, as shown in FIG. 4, the divided core 31c is preferably positioned on the surface of the stopping plate 33 and at least a part of the divided core 31c is preferably separated from the core holder 32. Similar to the divided core 31c, the divided cores 31a, 31b, 31d, and 31e are preferably positioned on the surface of the stopping plate 33 and at least some of the divided cores 31a, 31b, 31d, and 31e are preferably separated from the core holder 32. The divided cores 31a-31e can move within a predetermined range with respect to the core holder 32 and the stopping plate 33 while they are being held by the core holder 32 and the stopping plate 33.

The distance D1 between the inner wall surface of the sliding part holding hole 2b of the movable die 2 and the plate parts 31ab-31eb is preferably shorter than the distance D2 between the inner wall surface of the hole 32a of the core holder 32 and the plate parts 31ab-31eb. Therefore, the plate parts 31ab-31eb of the divided cores 31a-31e can respectively swing in the direction that is perpendicular to the inner wall surface of the hole 2d (in this example, in the z-axis direction).

The core holder 32 and the stopping plate 33 are each preferably provided with technical means for applying a force to the core holder 32 and the stopping plate 33 from the side of the stopping plate 33 in such a way that the sliding part 3 approaches or is separated from the hole 2d in the sliding direction of the sliding part 3. This technical means may be a large variety of mechanisms and devices such as a motor, a hydraulic cylinder, and a cam mechanism. The sliding part 3 is slid in the holes 2c and 2d by this technical means. Since the core holder 32 tends to be thicker than the core 31, the sliding part 3 can stably slide by applying a force to the core holder 32 and the stopping plate 33 from the side of the stopping plate 33.

(Method of manufacturing Resin Body)

Figure 10:
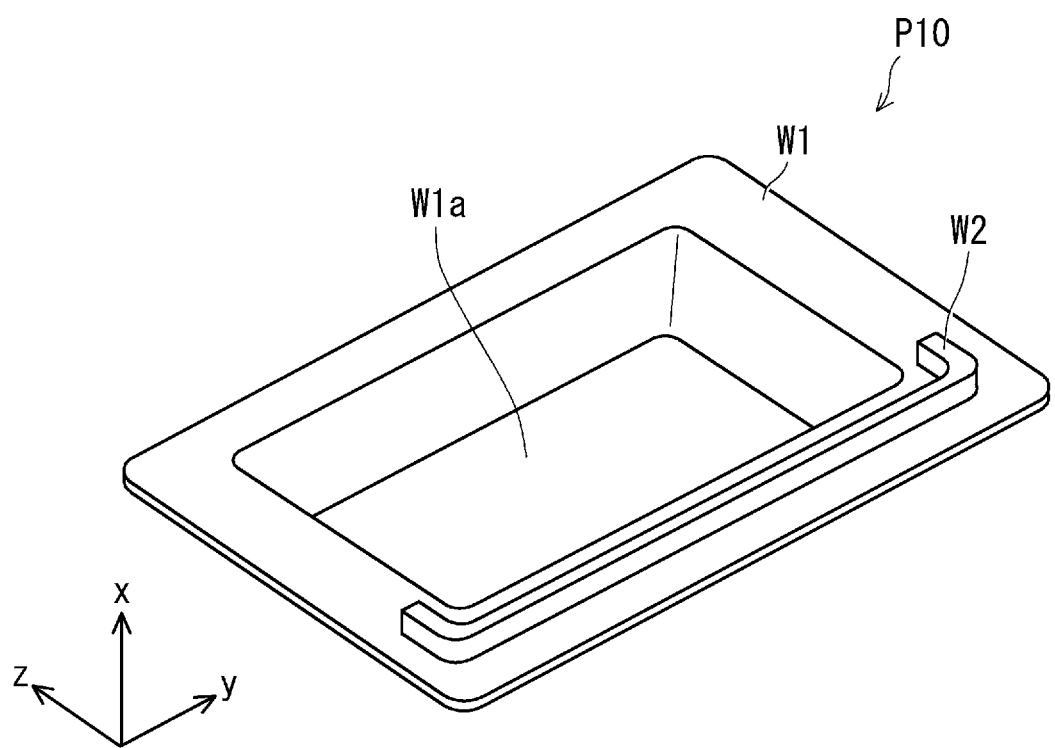
FIG. 10 is a perspective view showing one example of the resin body according to the first embodiment.
Figure 11:
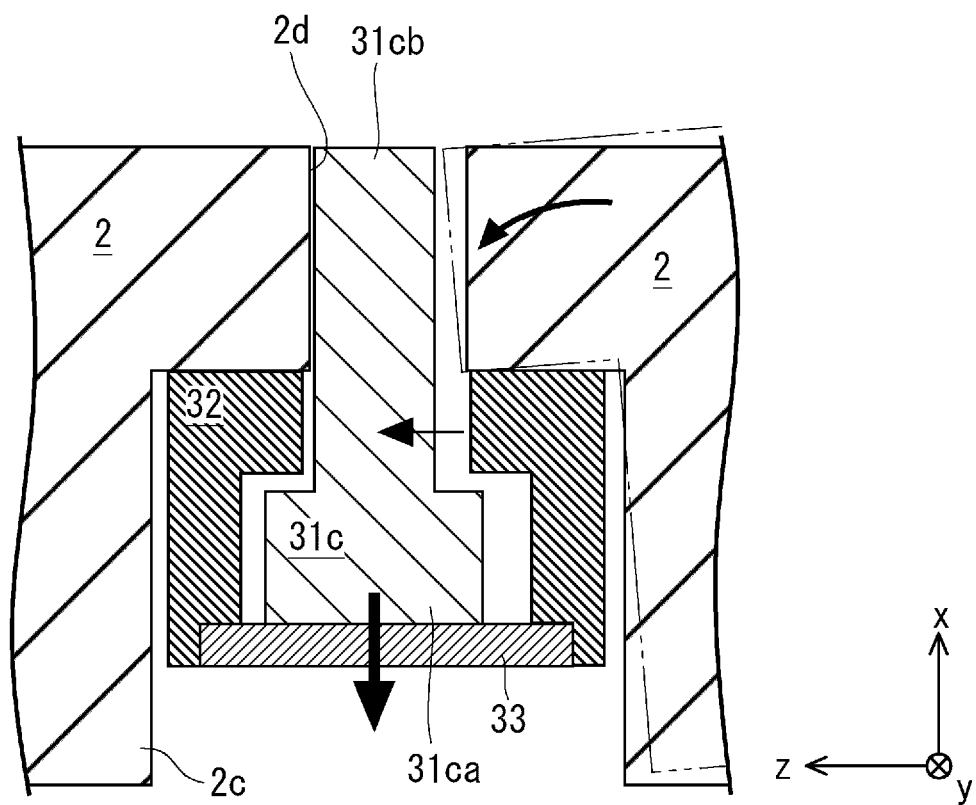
FIG. 11 is a schematic view showing operations of the core of the mold of the resin body according to the first embodiment.

Next, a method of manufacturing the resin body according to the first embodiment will be explained. FIGS. 5-9 are views each showing one process of the method of manufacturing the resin body according to the first embodiment. FIG. 10 is a perspective view showing one example of the resin body according to the first embodiment. FIG. 11 is a schematic view showing operations of the core of the mold of the resin body according to the first embodiment.

Figure 5:
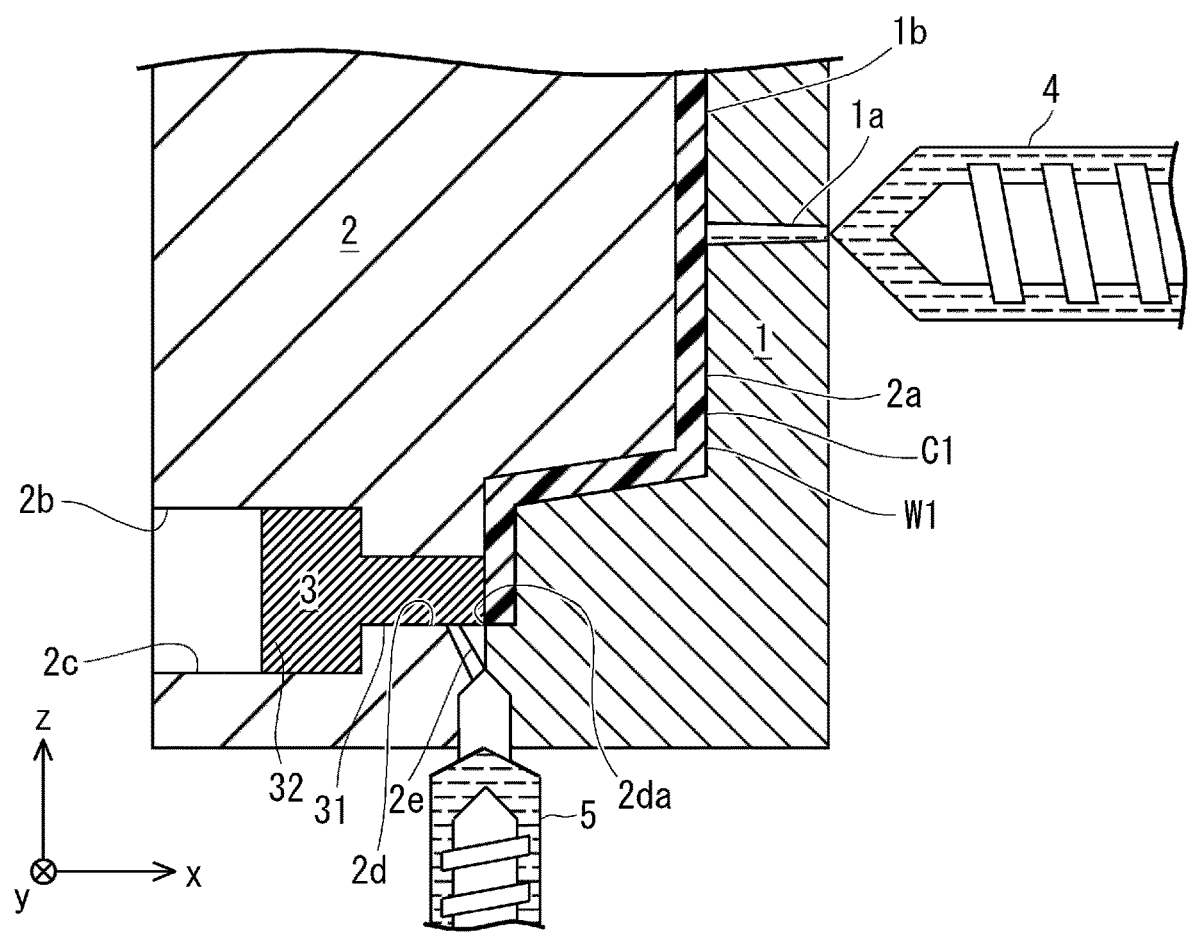
FIG. 5 is a view showing one process of a method of manufacturing the resin body according to the first embodiment.

As shown in FIGS. 1 and 5, the resin material is filled into the resin base material molding cavity C1 from the resin base material molding injection nozzle 4, thereby forming a resin base material W1 (resin base material forming process ST1). Specifically, first, while pressing the movable die 2 against the fixed die 1, the tip of the core 31 of the sliding part 3 is positioned at the distal end of the hole 2d on the side of the resin base material molding cavity C1 (in this example, x-axis direction positive side). Accordingly, an opening part 2da that communicates from the resin base material molding cavity C1 to the foamed resin part molding cavity C2 is interrupted. The resin material is injected from the resin base material molding injection nozzle 4, passes the inflow hole 1a of the fixed die 1, and is filled into the resin base material molding cavity C1. Since the opening part 2da is interrupted, the resin material rarely enters the foamed resin part molding cavity C2. After the filling process, the resin material is solidified in the resin base material molding cavity C1, whereby the resin base material W1 is formed.

Figure 6:
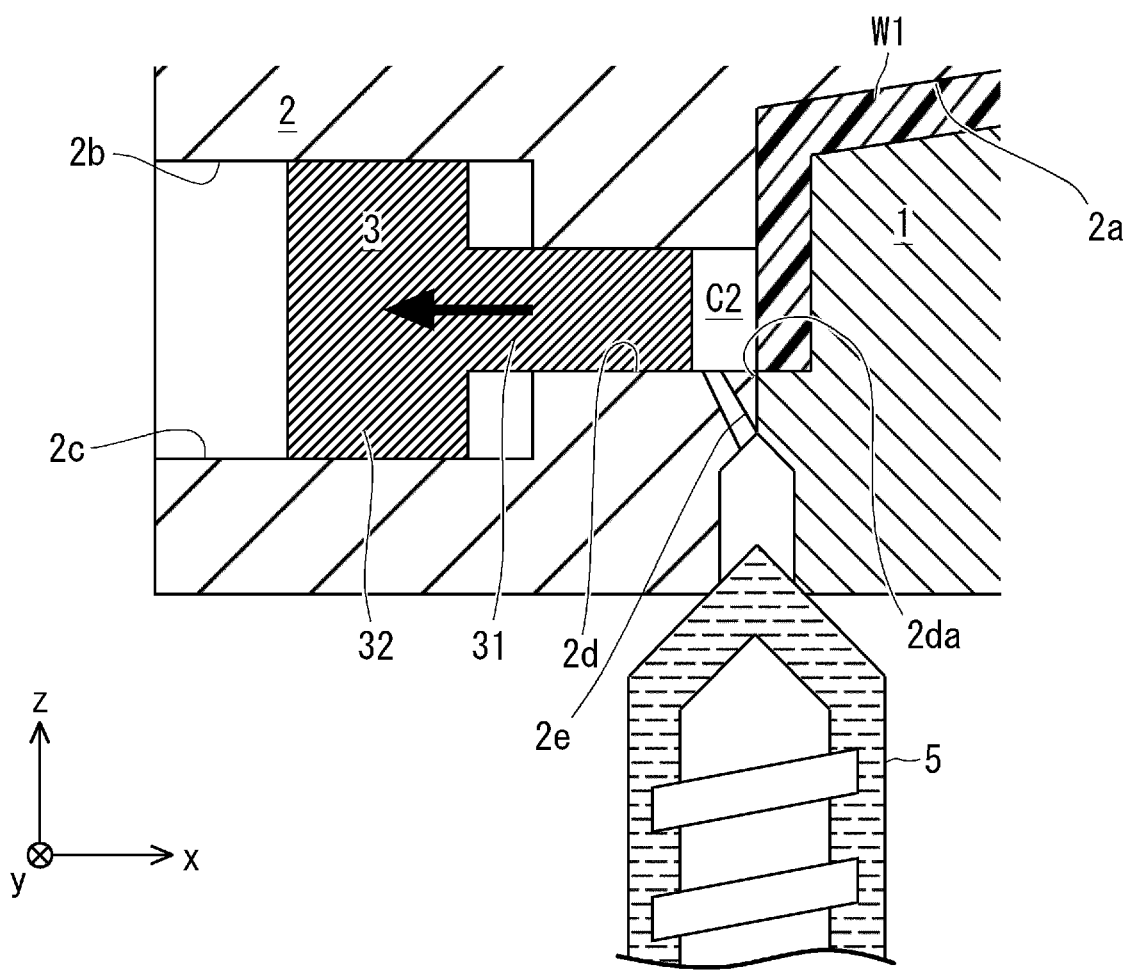
FIG. 6 is a view showing one process of the method of manufacturing the resin body according to the first embodiment.
Figure 7:
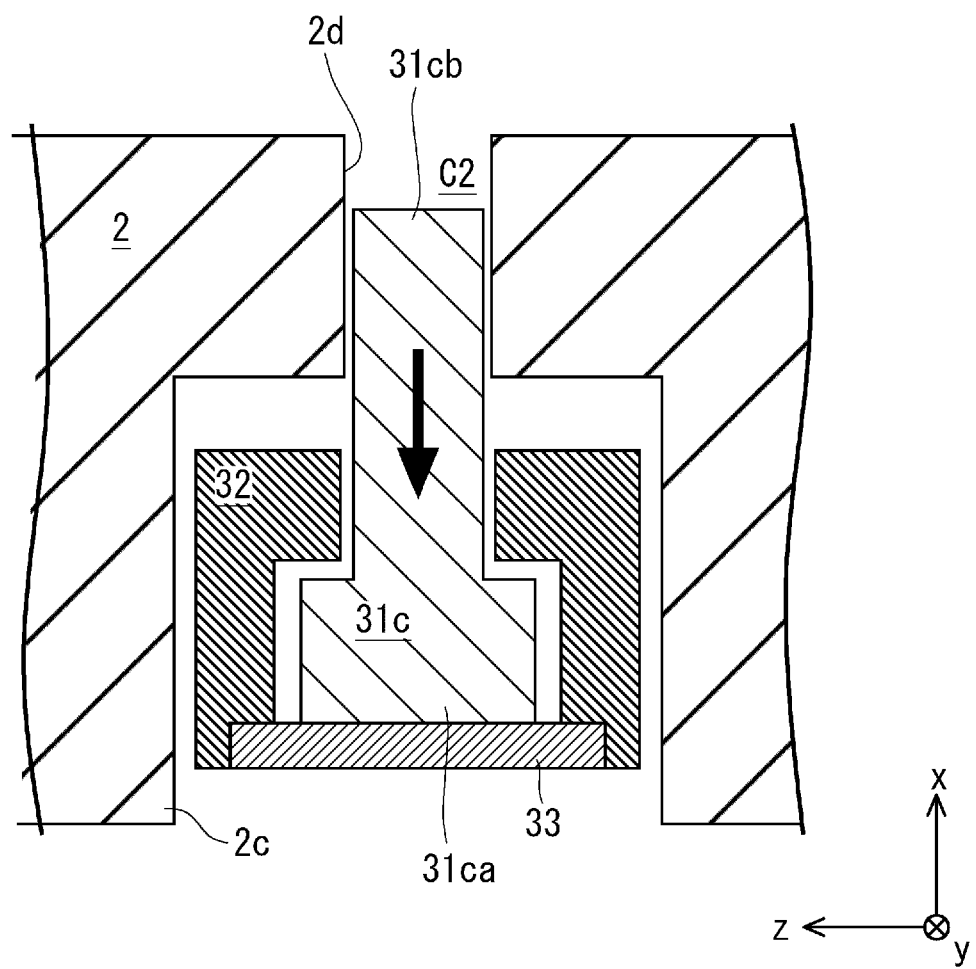
FIG. 7 is a view showing one process of the method of manufacturing the resin body according to the first embodiment.

Next, as shown in FIGS. 6 and 7, the sliding part 3 is separated from the resin base material molding cavity C1 (sliding part retracting process ST2). In the foamed resin part molding cavity C2, the filling space that can be filled with the foamed resin material is increased.

Figure 8:
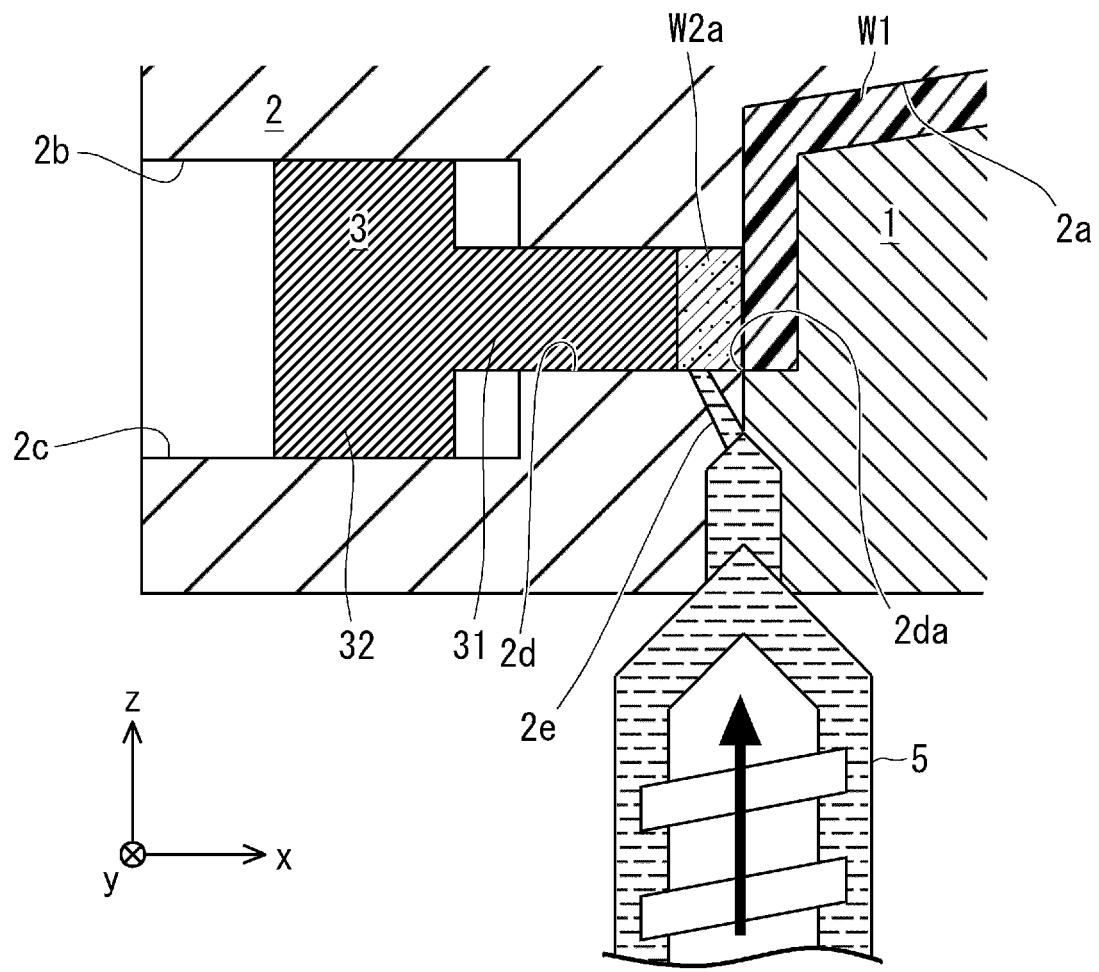
FIG. 8 is a view showing one process of the method of manufacturing the resin body according to the first embodiment.

Next, as shown in FIG. 8, a foamed resin material W2a is filled into the foamed resin part molding cavity C2 from the foamed resin part molding injection nozzle 5 via the inflow hole 2e (foamed resin filling process ST3).

Figure 9:
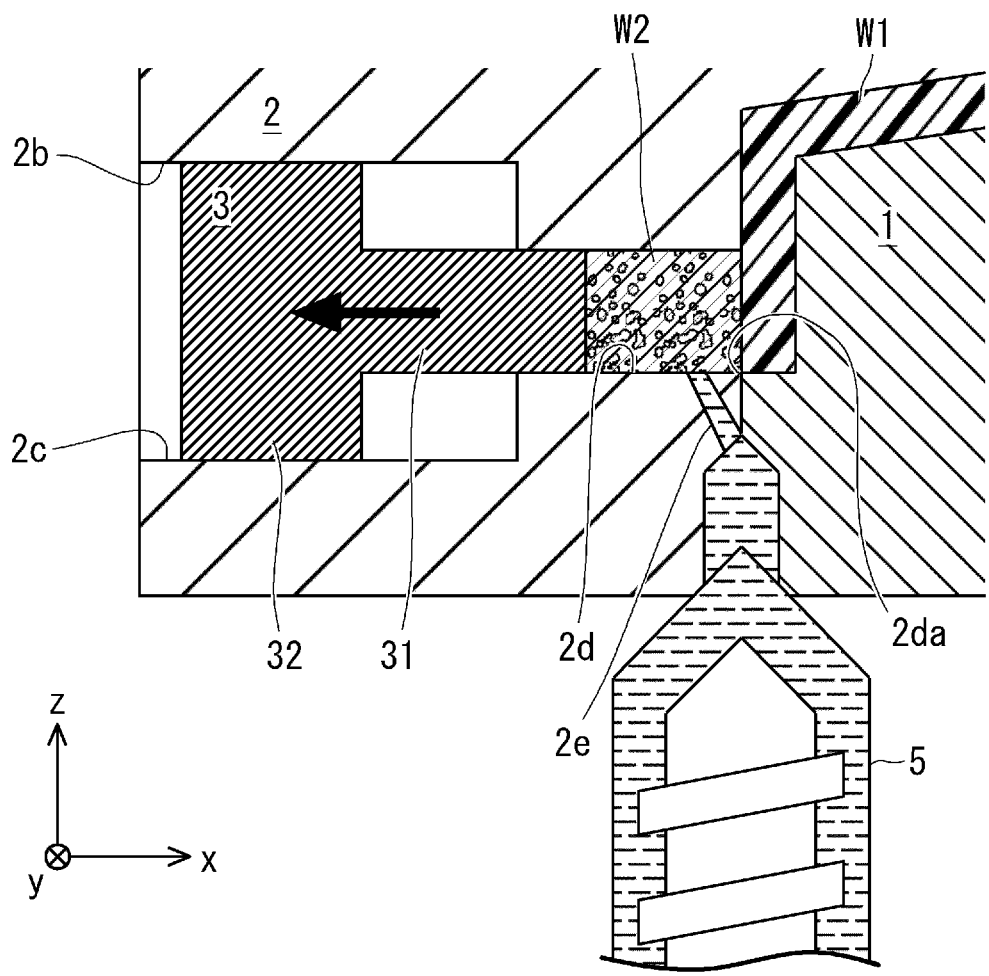
FIG. 9 is a view showing one process of the method of manufacturing the resin body according to the first embodiment.

Lastly, as shown in FIG. 9, by foaming the foamed resin material W2a, a foamed resin part W2 is formed on the resin base material W1 (foaming process ST4). The sliding part 3 (see FIG. 9) is preferably separated from the resin base material molding cavity C1 as appropriate.

From the aforementioned processes, a resin body P10 is formed. As shown in FIG. 10, one example of the resin body P10 includes the resin base material W1 and the foamed resin part W2. The resin base material W1 is a dish-shaped body including a recessed part W1a that is concaved in a rectangular parallelepiped shape. The foamed resin part W2 is arranged in the vicinity of the outer periphery of the resin base material W1, and is extended along one side of the recessed part W1a and is extended so as to surround both end parts of one side of the recessed part W1a.

A large variety of resins may be used for the resin base material W1. A resin that can be foamed may be used for the foamed resin part W2. This resin that can be foamed includes, for example, thermoplastic elastomer. Specific examples include saturated styrene elastomer, polyolefin, or a compound thereof, or ethylene-propylene rubber, ethylene propylene diene rubber or the like. A foaming agent may be anything that is capable of foam molding elastomer by injection molding, and may be, for example, sodium bicarbonate or azo compounds.

In the aforementioned method of manufacturing the resin body, the mold 10 may be distorted and deformed since heat is given thereto by the resin material, the foamed resin material W2a and the like. When, in particular, the aforementioned method of manufacturing the resin body is repeatedly performed, this deformation tends to occur. As shown in FIG. 11, the movable die 2 is distorted and deformed, and contacts the plate part 31cb of the divided core 31c, which is one example of the distal end of the core 31. However, since the divided core 31c swings in the direction that is perpendicular to the inner wall surface of the hole 2d (in this example, the direction along the yz plane, e.g., z-axis direction), the divided core 31c can swing and move with respect to the hole 2d before the movable die 2 is deformed. Therefore, mechanical interference between the movable die 2 and the sliding part 3 does not tend to occur. Accordingly, the aforementioned method of manufacturing the resin body can be further repeated. That is, the foamed resin part W2 and the resin base material W1 are integrally molded, and the resin body P10 can be molded using only one mold 10, without using a plurality of molds. It is therefore possible to reduce the cost of manufacturing the resin body P10.

Further, when the core 3 includes a plurality of divided cores (e.g., divided cores 31a-31e), the divided core tends to swing in the direction that is perpendicular to the inner wall surface of the hole 2d more easily. Therefore, the divided core can slide with respect to the hole 2d before the movable die 2 is deformed. Accordingly, the aforementioned method of manufacturing the resin body can be further repeated.

One Modified Example of Core of Mold

Figure 12:
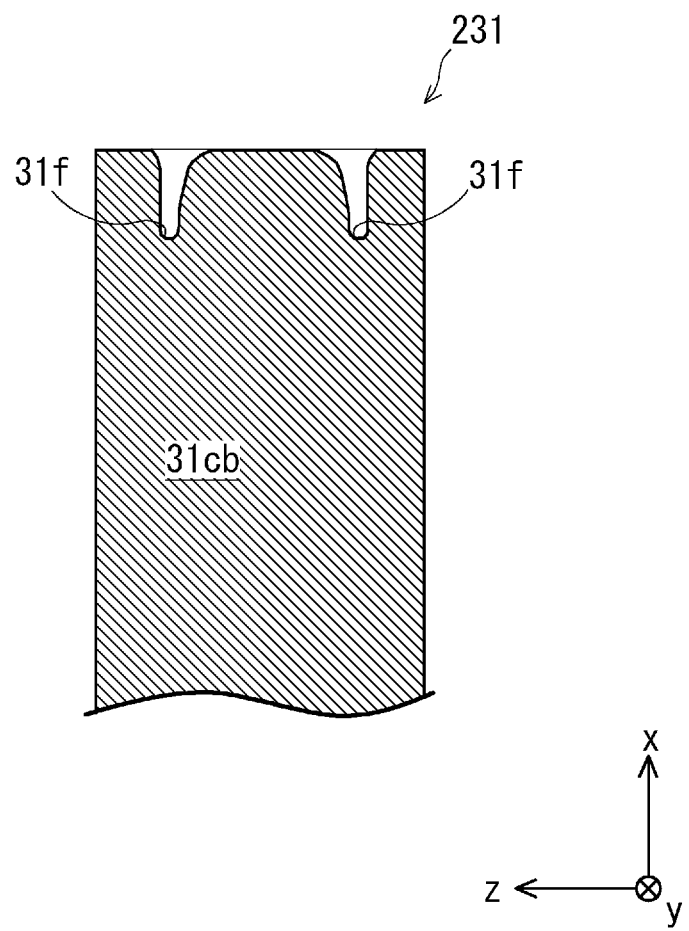
FIG. 12 is a schematic view showing an xz cross section of a plate part 31cb.

Referring next to FIG. 12, one modified example of the core of the mold of the resin body according to the first embodiment will be explained. FIG. 12 is a schematic view showing the xz cross section of the plate part 31cb. A core 231 includes a structure the same as those of the divided cores 31a-31e, which are examples of the cores 31, except that the plate parts 31ab, 31bb, 31cb, 31db, and 31eb each include a recessed part 31f. The recessed part 31f is provided on the distal end surface of the core 231 on the side of the resin base material molding cavity C1 (in this example, x-axis direction positive side). The shape of the recessed part 31f is not limited to the shape shown in FIG. 12, and may be a wide variety of shapes. Further, only one recessed part 31f may be provided or a plurality of recessed parts 31f may be provided.

One Modified Example of Method of Manufacturing Resin Body

Figure 14:
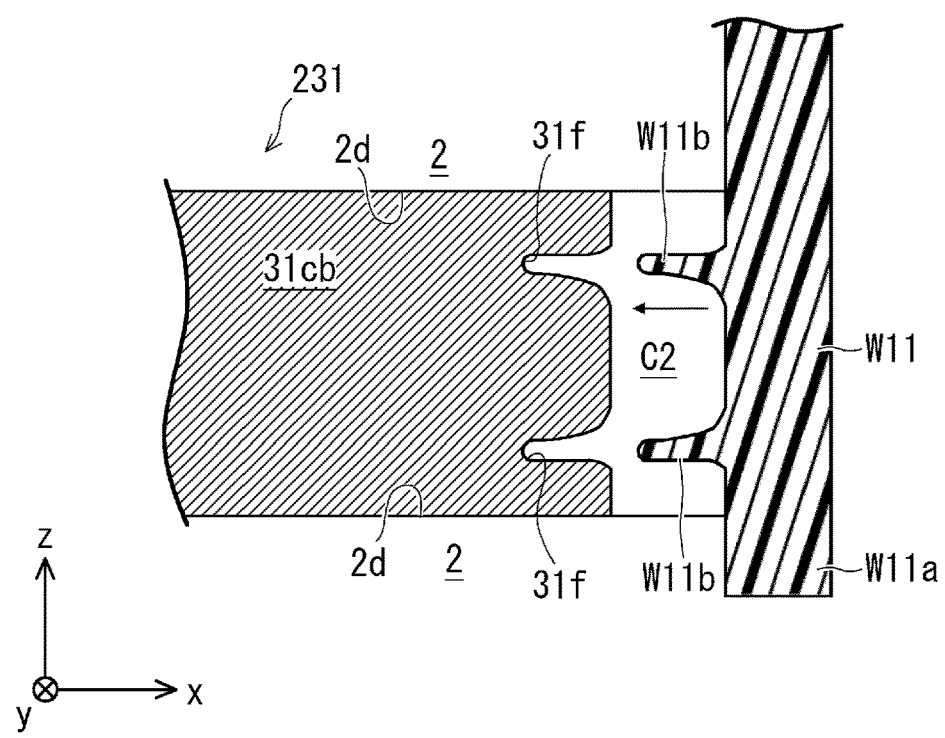
FIG. 14 is a view showing one process of one modified example of the method of manufacturing the resin body according to the first embodiment.
Figure 15:
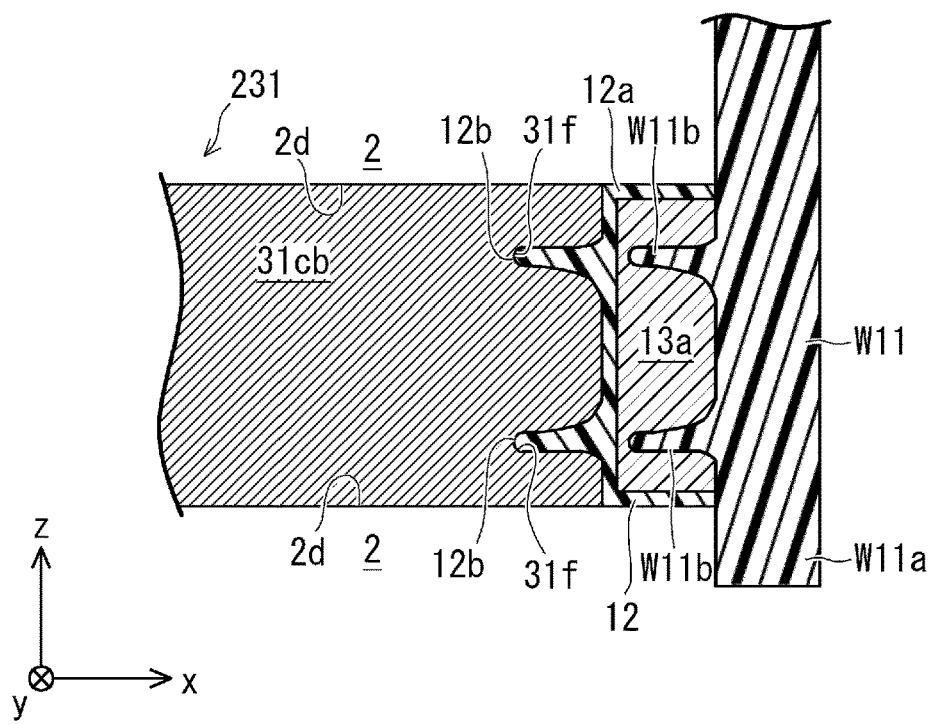
FIG. 15 is a view showing one process of one modified example of the method of manufacturing the resin body according to the first embodiment.
Figure 16:
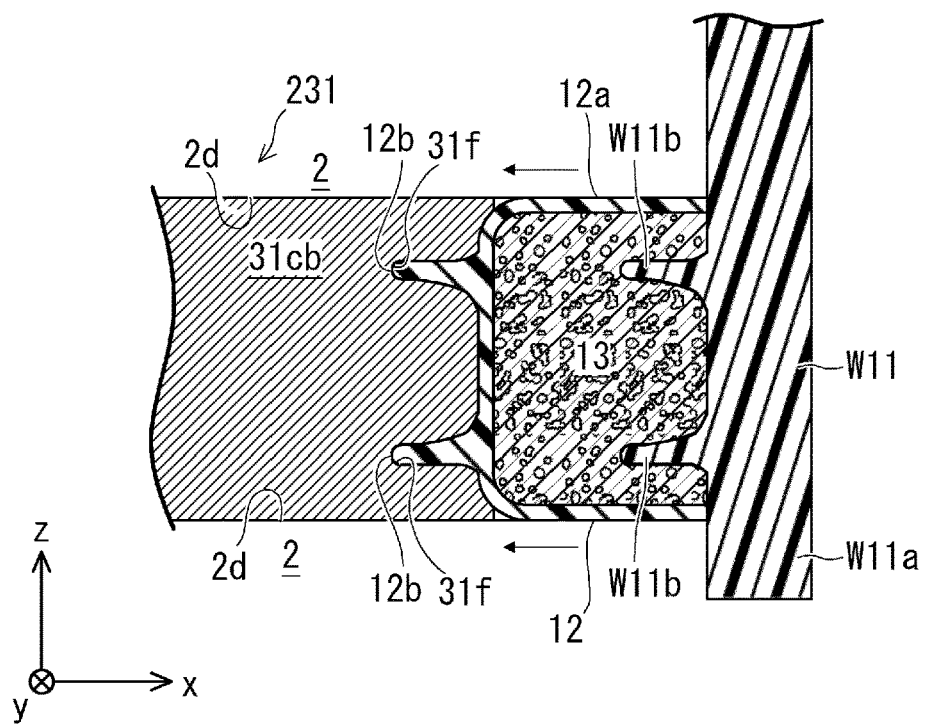
FIG. 16 is a view showing one process of one modified example of the method of manufacturing the resin body according to the first embodiment.
Figure 17:
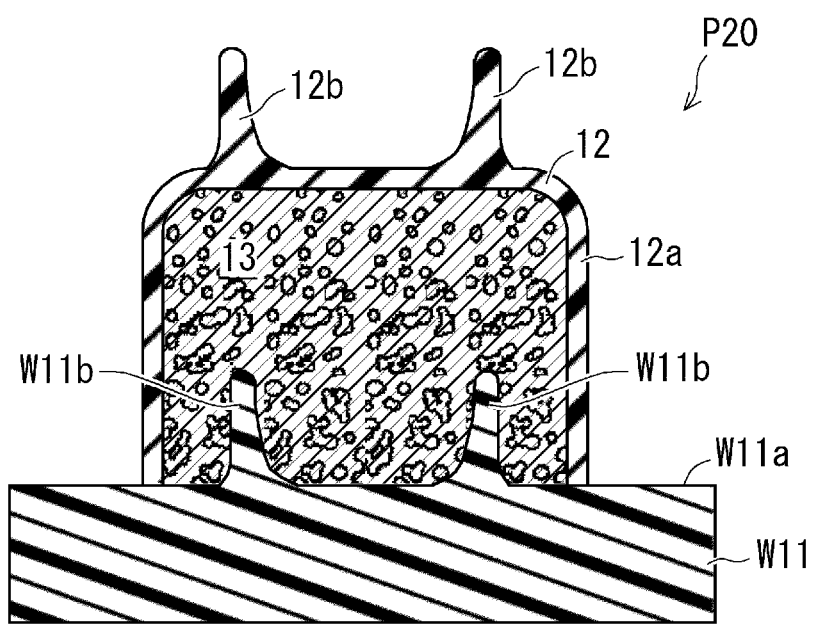
FIG. 17 is a schematic cross-sectional view showing one modified example of the resin body according to the first embodiment.
Figure 18:
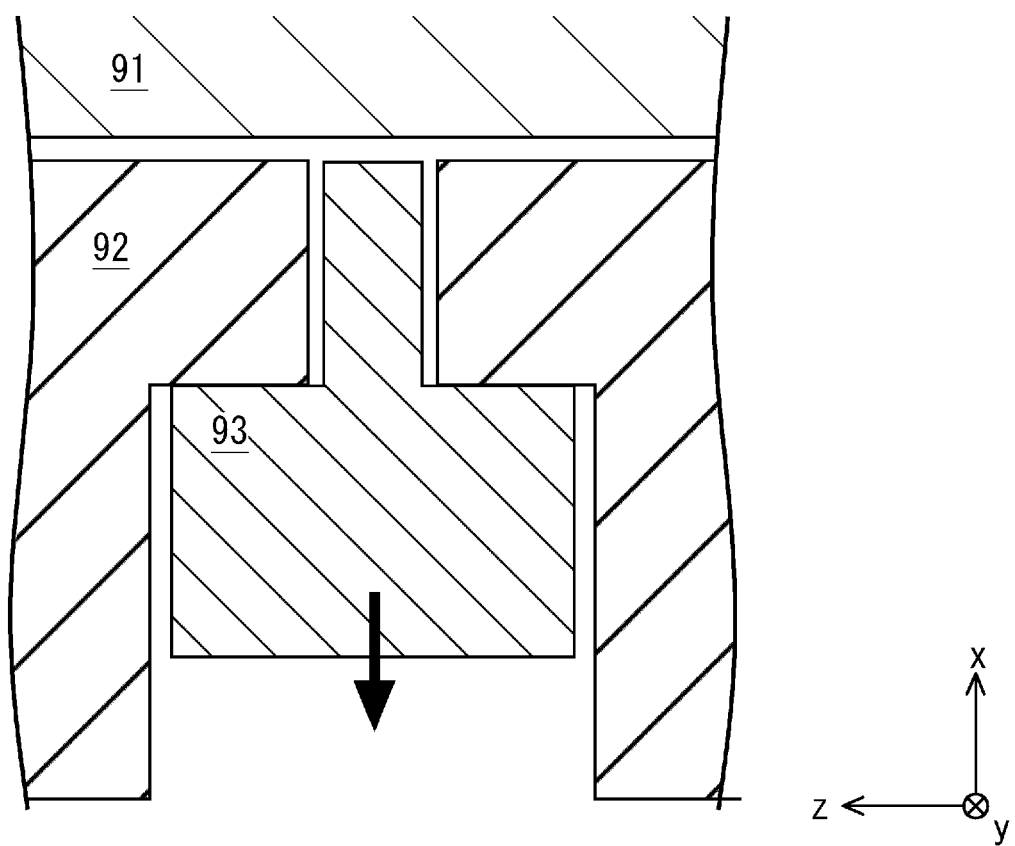
FIG. 18 is a schematic cross-sectional view of main parts of a mold according to a problem to be solved by the present disclosure.
Figure 19:
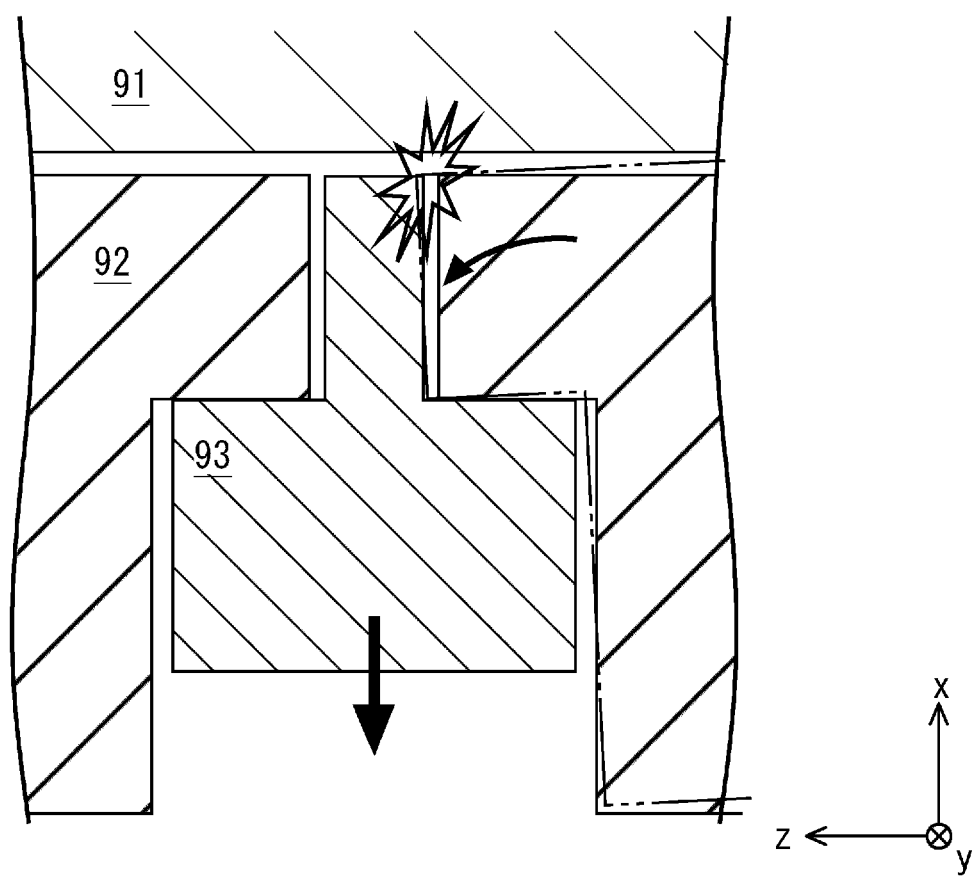
FIG. 19 is a schematic cross-sectional view of the main parts of the mold according to the problem to be solved by the present disclosure.

Referring next to FIGS. 5-9 and 13-17, one modified example of the method of manufacturing the resin body according to the first embodiment will be explained. One modified example of the method of manufacturing the resin body according to the first embodiment is the same as the aforementioned method of manufacturing the resin body according to the first embodiment except that the core 231 is used. Only the configuration different from that of the aforementioned method of manufacturing the resin body according to the first embodiment will be explained. FIGS. 13-16 are views each showing one process of the method of manufacturing the resin body according to the first embodiment. FIG. 16 is a perspective view showing one example of the resin body according to the first embodiment. While the plate part 31cb is shown in FIGS. 13-16, the plate parts 31ab, 31bb, 31db, and 31eb perform operations similar to those of the plate part 31cb. It should be noted that in FIGS. 13-16, the hatching of the movable die 2 is omitted for the sake of clarity. FIG. 17 is a schematic cross-sectional view showing one modified example of the resin body according to the first embodiment.

Figure 13:
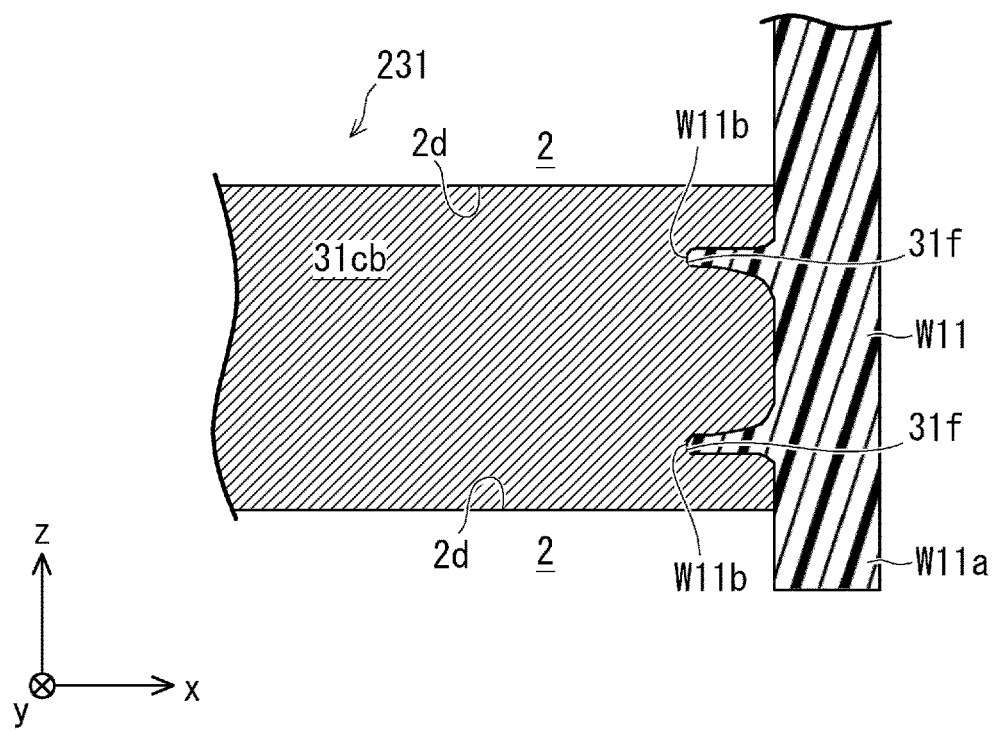
FIG. 13 is a view showing one process of one modified example of the method of manufacturing the resin body according to the first embodiment.

First, as shown in FIGS. 5 and 13, in the resin base material forming process ST1, the resin material is filled into the resin base material molding cavity C1 to form the resin base material W1. Then, after the resin material is filled into the recessed part 31f, the resin material is solidified inside the resin base material molding cavity C1, thereby forming a resin base material W11. The resin base material W11 includes a plate-shaped part W11a and a base material protruding part W11b protruded from the plate-shaped part W11a. The base material protruding part W11b has a shape in which the shape of the recessed part 31f is transferred.

Next, as shown in FIGS. 6 and 14, in the sliding part retracting process ST2, the sliding part 3 is separated from the resin base material molding cavity C1. Then, in the foamed resin part molding cavity C2, the filling space that can be filled with the foamed resin material is increased.

Next, as shown in FIGS. 8 and 15, in the foamed resin filling process ST3, a foamed resin material 13a is filled into the foamed resin part molding cavity C2. Then, after the foamed resin material 13a is made to flow into the recessed part 31f, the foamed resin material 13a in the vicinity of the interface with the core 231 is solidified while it is not at least foamed completely, whereby a surface skin part 12 is formed. The surface skin part 12 includes a surface skin body 12a and a protruding part 12b protruded from the surface skin body 12a. The surface skin body 12a covers the foamed resin material 13a that has not yet been solidified, and the protruding part 12b has a shape transferred to the recessed part 31f. Since the plate part 31cb of the divided core 31c includes the recessed part 31f, the contact area of the surface skin part 12 with the divided core 31c is large.

Lastly, as shown in FIGS. 9 and 16, in the foaming process ST4, by foaming the foamed resin material 13a, the foamed resin body 13 is formed. The sliding part 3 is preferably separated from the resin base material molding cavity C1 as appropriate. The foamed resin body 13 is foamed in such a way that the foaming ratio at least exceeds the foaming ratio of the surface skin part 12. The surface skin part 12 and the foamed resin body 13 are modified examples of the foamed resin part W2 (see FIG. 10).

From the aforementioned processes, a resin body P20 shown in FIG. 17 is formed. In the aforementioned modified example of the method of manufacturing the resin body, similar to the aforementioned method of manufacturing the resin body (see FIGS. 5-9), the mold may be distorted and deformed since heat is given thereto by the resin material, the foamed resin material or the like. Similar to the aforementioned method of manufacturing the resin body (see FIGS. 5-9), the movable die 2 is distorted and deformed, and contacts the core 231. However, since the core 231 swings, it can slide with respect to the hole 2d as before. Accordingly, the aforementioned method of manufacturing the resin body can be further repeated.

Further, the plate part 31cb includes the recessed part 31f. Therefore, in the foaming process ST4, when the foamed resin material 13a is filled into the foamed resin part molding cavity C2, the contact area of the surface skin part 12 with the plate part 31cb is large. The surface skin part 12 is a part of one modified example of the foamed resin part W2 and the plate part 31*cb* of the divided core 31*c* is a part of one modified example of the core 31 of the sliding part 3. That is, it is possible to increase the contact area of the foamed resin part with the sliding part. Since it is possible to prevent the foamed resin part from being away from the sliding part, it is therefore possible to mold the foamed resin part with a high precision.

One Modified Example of Resin Body

Next, with reference to FIG. 17, the resin body P20, which is one modified example of the resin body P10, will be explained.

As shown in FIG. 17, the resin body P20 includes the resin base material W11, the surface skin part 12, and the foamed resin body 13.

The resin base material W11 includes a plate-shaped part W11*a* and a base material protruding part W11*b*. The base material protruding part W11*b* is provided between the resin base material W11 and the foamed resin body 13 and is protruded from the plate-shaped part W11*a* to the foamed resin body 13. The resin base material W11 may have a shape the same as that of the resin base material W1 shown in FIG. 10.

The foamed resin body 13 is arranged on the surface of the resin base material W11. The surface skin part 12 includes a surface skin body 12*a* and a protruding part 12*b*. The surface skin body 12*a* covers the surface of the foamed resin body 13. The protruding part 12*b* is protruded from the surface skin body 12*a* on a side opposite to the resin base material W11 (in this example, on the x-axis negative side). The surface skin part 12 and the foamed resin body 13 may each have a shape that is the same as that of the foamed resin part W2 shown in FIG. 10.

The foaming ratio of the foamed resin body 13 is higher than the foaming ratio of the surface skin part 12. The foamed resin body 13 is less rigid than the surface skin part 12 and has a high cushioning performance. On the other hand, the surface skin part 12 is more rigid than the foamed resin body 13 and has a high sealing performance.

Note that the present disclosure is not limited to the aforementioned embodiment and may be changed as appropriate without departing from the spirit of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A mold of a resin body including a resin base material molding die part for molding a resin base material, the mold of the resin body comprising:
   a sliding part capable of sliding inside a foamed resin part molding cavity that communicates with a resin base material molding cavity of the resin base material molding die part, wherein
   the sliding part includes a core, a core holder, and a stopping plate, the core comprising a plurality of divided cores, each of the divided cores including a base part and a plate part that is extended from the base part, a cross-sectional area of the base part being larger than a cross-sectional area of the plate part,
   the core holder includes a hole that holds the plurality of divided cores, the plate parts of the plurality of divided cores protruding through the hole of the core holder,
   the stopping plate is fitted into a side opposite to the hole of the core holder in the core holder so as to abut the base parts of the plurality of divided cores,
   a distance between an inner wall surface of a sliding part holding hole of the resin base material molding die part and the plate part of one of the plurality of divided cores is less than a distance between an inner wall surface of the hole of the core holder and the plate part of the one of the plurality of divided cores such that the sliding part is swingably floated in a direction perpendicular to a sliding surface on which the sliding part slides,
   in the process of molding the resin base material, the sliding part blocks an opening part that communicates from the resin base material molding cavity to the foamed resin part molding cavity, and
   in the process of molding the foamed resin part, after a foamed resin material is filled into the foamed resin part molding cavity, the sliding part is separated from the resin base material molding cavity, thereby increasing a filling space that can be filled with the foamed resin material.

2. The mold of the resin body according to claim 1, wherein a recessed part is provided on a distal end surface of the sliding part on a side of the resin base material molding cavity.

3. The mold of the resin body according to claim 1, wherein the core holder is thicker than the core.

\* \* \* \* \*